(12) United States Patent
Reitz et al.

(10) Patent No.: US 6,736,106 B2
(45) Date of Patent: May 18, 2004

(54) ENGINE VALVE ACTUATION FOR COMBUSTION ENHANCEMENT

(75) Inventors: Rolf Deneys Reitz, Madison, WI (US); Christopher J. Rutland, Madison, WI (US); Rahul Jhavar, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 102 days.

(21) Appl. No.: 10/350,053

(22) Filed: Jan. 23, 2002

(65) Prior Publication Data

US 2003/0136375 A1 Jul. 24, 2003

(51) Int. Cl.$^7$ ................................................ F02B 75/02
(52) U.S. Cl. ...................................... 123/316; 123/347
(58) Field of Search ................................. 123/316, 347, 123/348, 350, 564, 327

(56) References Cited

U.S. PATENT DOCUMENTS

| | | | | | |
|---|---|---|---|---|---|
| 3,714,932 | A | * | 2/1973 | Meacham et al. | 123/316 |
| 5,201,907 | A | * | 4/1993 | Hitomi et al. | 123/316 |
| 5,228,422 | A | * | 7/1993 | Wakeman | 123/316 |
| 5,353,763 | A | * | 10/1994 | Schatz | 123/316 |
| 5,862,790 | A | * | 1/1999 | Dai et al. | 123/316 |
| 6,405,706 | B1 | * | 6/2002 | Hammoud et al. | 123/316 |
| 6,460,337 | B1 | * | 10/2002 | Olofsson | 123/316 |
| 6,571,765 | B2 | * | 6/2003 | Kuboshima et al. | 123/316 |

* cited by examiner

Primary Examiner—Henry C. Yuen
Assistant Examiner—Jason Benton
(74) Attorney, Agent, or Firm—Craig A. Fieschko, Esq.; DeWitt Ross & Stevens S.C.

(57) ABSTRACT

A combustion chamber valve, such as an intake valve or an exhaust valve, is briefly opened during the compression and/or power strokes of a 4-stroke combustion cycle in an internal combustion engine (in particular, a diesel or CI engine). The brief opening may (1) enhance mixing withing the combustion chamber, allowing more complete oxidation of particulates to decrease engine emissions; and/or may (2) delay ignition until a more desirable time, potentially allowing a means of timing ignition in otherwise difficult-to-control conditions, e.g., in HCCI (Homogeneous Charge Compression Ignition) conditions.

48 Claims, 1 Drawing Sheet

ENGINE VALVE ACTUATION FOR COMBUSTION ENHANCEMENT

STATEMENT REGARDING FEDERALLY SPONSORED RESEARCH

Figure 1:
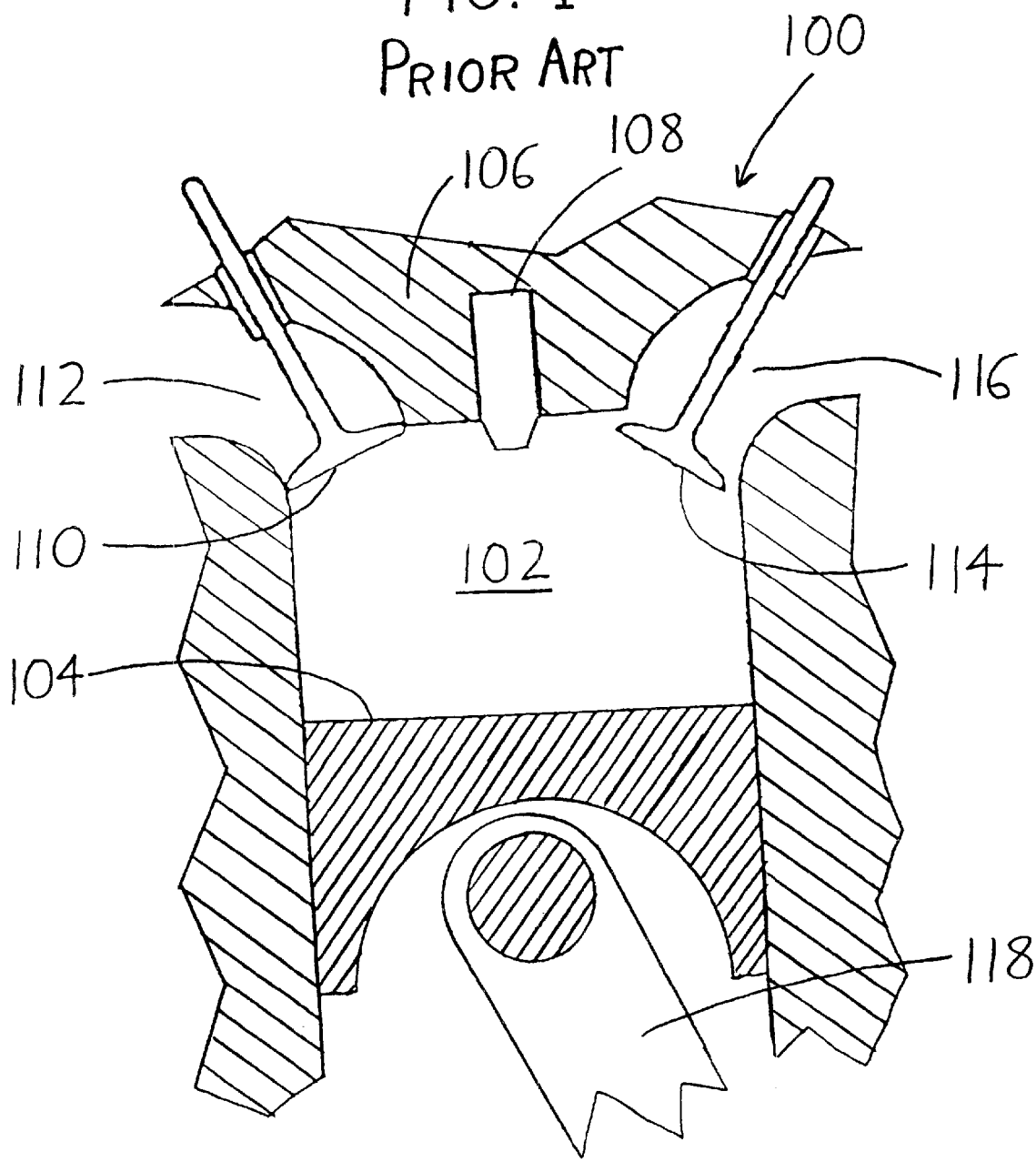

This invention was made with United States government support awarded by the following agencies:

U.S. Department of Energy Grant No(s).: DE-FC04-02AL67612 The United States has certain rights in this invention.

FIELD OF THE INVENTION

This disclosure concerns an invention relating generally to combustion methodologies for internal combustion engines, and more specifically to combustion methodologies resulting in decreased pollutant emissions.

BACKGROUND OF THE INVENTION

For better understanding of the invention described in this document, it is initially useful to review basic principles of internal combustion engine structure and operation. FIG. 1 depicts a cylinder in a simple idealized internal combustion engine 100, including a combustion chamber 102 defined between a piston 104 and a cylinder head 106. The cylinder head 106 includes a fuel injector 108 and a pair of combustion chamber valves, an intake valve 110 for intake of air from an intake manifold 112, and an exhaust valve 114 for exhaust of combustion products to an exhaust manifold 116 and exhaust system. As is well known, the engine 100 operates by engaging in a combustion cycle, wherein fuel is burned in the combustion chamber 102 to expand the gases (primarily air) therein and drive the piston 104. The piston 104 in turn drives a crank 118 associated with the piston 104, with the crank 118 in turn driving the crankshaft (not shown) which provides power output for a vehicle drive train or to other structures for transmitting mechanical power. The classical four-stroke combustion cycle for both SI (spark ignition or gasoline) engines and CI (compression ignition or diesel) engines involves the following steps:

(1) An intake stroke, wherein the intake valve 110 is opened while piston 104 retreats from cylinder head 106 to draw air into the combustion chamber 102 from the intake manifold 112.

(2) A compression stroke, wherein the piston 104 approaches cylinder head 106 with the combustion chamber valves 110 and 114 closed (at least during the latter portion of the stroke).

(3) A power or expansion stroke, wherein fuel injected into the combustion chamber 102 is ignited and the expanding gases within the combustion chamber 102 push the piston 104 outwardly (as during the intake stroke). Again, the combustion chamber valves 110 and 114 usually remain closed (at least during the early portion of the stroke).

(4) An exhaust stroke, wherein the combustion products within the combustion chamber 102 are expelled to the exhaust manifold 116 by advancing the piston 104 towards the cylinder head 106 with the exhaust valve 114 open.

Each stroke occurs over 180 degrees of crankshaft rotation, with the entire cycle thereby occurring over 720 degrees (two full crankshaft revolutions). The combustion chamber valves 110 and 114 are usually opened and closed at the desired times by valve actuators such as cams or other structures, which are in turn driven by the crankshaft (not shown). Since such arrangements couple the timing and extent of valve opening and closing to the positioning of the crankshaft, and since it may be desirable to have a greater degree of control over valve actuation to achieve desired combustion chamber conditions, there has been a recent trend towards the use of variable valve timing technologies. These technologies wholly or partially decouple the timing and/or extent of valve actuation from the crankshaft position, and allow the valves 110 and 114 to be opened and/or closed when desired (and may also allow the degree of opening to be varied as desired). Examples of variable valve actuation (VVA) schemes may be found, for example, in U.S. Pat. Nos. 4,777,915; 4,829,947; and 5,515,818.

The foregoing combustion cycle steps/strokes differ between classical SI and CI engines in that SI engines tend to inject fuel during the intake stroke, whereas CI engines tend to inject fuel late in the compression stroke or early in the power stroke, close to "top dead center" (TDC), the piston 104's point of closest approach to the cylinder head 106. Additionally, in SI engines, ignition of the fuel/air mixture occurs by introduction of a spark (with no spark plug being illustrated in FIG. 1). In contrast, classical CI engines rely on the compression stroke to increase the heat and pressure in the combustion chamber 102 to such a degree that ignition results. There are also various types of "hybrid" engines which operate using a combination of SI and CI principles, or example, engines which run primarily on CI principles but which use a spark or "glow plug" to assist with ignition. (Also note that the engine of FIG. 1 is described as a "simple idealized" one since real-world engines may have a wide variety of combustion chamber configurations other than those shown at 102 in FIG. 1, and may have varying numbers, locations, and configurations of combustion chamber valves 110 and 114 and/or injectors 108.)

In the field of engine development and manufacture, two concerns of critical importance are engine efficiency (e.g., power output per fuel consumption) and engine emissions. Diesel engines tend to operate more efficiently than SI engines, but they unfortunately also tend to have much greater pollutant emissions than SI engines. Common pollutants arising from the use of internal combustion engines are nitrogen oxides (commonly denoted $NO_x$) and particulates (also known simply as "soot"). $NO_x$ is generally associated with high-temperature engine conditions, and may be reduced by use of measures such as exhaust gas recirculation (EGR), wherein the engine intake air is diluted with relatively inert exhaust gas (generally after cooling the exhaust gas). This reduces the oxygen in the combustion chamber and obtains a reduction in maximum combustion temperature, thereby deterring $NO_x$ formation. Particulates (soot) include a variety of matter such as elemental carbon, heavy hydrocarbons, hydrated sulfuric acid, and other large molecules, and are generally associated with incomplete combustion. Particulates can be reduced by increasing combustion and/or exhaust temperatures, or by providing more oxygen to promote oxidation of the soot particles. Unfortunately, measures which reduce $NO_x$ tend to increase particulate emissions, and measures which reduce particulates tend to increase $NO_x$ emissions, resulting in what is often termed the "soot-$NO_x$ tradeoff".

At the time of this writing, the diesel engine industry is facing stringent emissions legislation in the United States, and is struggling to find methods to meet government-imposed $NO_x$ and soot targets for the years 2002–2004 and even more strict standards to be phased in starting in 2007. One measure under consideration is use of exhaust after-treatment (e.g., particulate traps) for soot emissions control in both heavy-duty truck and automotive diesel engines. However, in order to meet mandated durability standards (e.g., 50,000 to 100,000 miles), the soot trap must be periodically regenerated (the trapped soot must be periodically re-burned). This requires considerable expense and complexity, since typically additional fuel must be mixed and ignited in the exhaust stream in order to oxidize the accumulated particulate deposits.

Apart from studies directed to after-treatment, there has also been intense interest in the more fundamental issue of how to reduce $NO_x$ and particulates generation from the combustion process and thereby obtain cleaner "engine out" emissions (i.e., emissions directly exiting the engine, prior to exhaust after-treatment or similar measures). Studies in this area relate to shaping combustion chambers, timing the fuel injection, tailoring the injection rate during injection so as to meet desired emissions standards, or modifying the mode of injection (e.g, modifying the injection spray pattern). One field of study relates to premixing methodologies, wherein the object is to attain more complete mixing of fuel and air in order to simultaneously reduce soot and $NO_x$ emissions. In diesel engines, the object of premixing methodologies is to move away from the diffusion burning mechanism which drives diesel combustion, and instead attempt to attain premixed burning. In diffusion burning, the oxidant (fuel) is provided to the oxidizer (air) with mixing and combustion occurring simultaneously. The fuel droplets within an injected spray plume have an outer reaction zone surrounding a fuel core which diminishes in size as it is consumed, and high soot production occurs at the high-temperature, fuel-rich spray core. In contrast, premixed burning mixes fuel and air prior to burning, and the more thorough mixing results in less soot production. Premixing may be performed by a number of different measures, such as by use of fumigation (injection of fuel into the intake airstream prior to its entry into the engine), and/or direct injection of a fuel charge relatively far before top dead center (TDC) so that motion of the piston 104, and convection within the cylinder, result in greater mixing.

One promising diesel premixing technology is HCCI (Homogeneous Charge Compression Ignition), which has the objective of causing initial ignition of a lean, highly premixed air-fuel mixture at or near top dead center (TDC). An extensive discussion on HCCI and similar premixing techniques is provided in U.S. Pat. No. 6,230,683 to zur Loye et al., and U.S. Pat. No. 5,832,880 to Dickey and U.S. Pat. No. 6,213,086 to Chmela et al. also contain useful background information. The charge is said to be "homogeneous" in HCCI because it is (at least theoretically) highly and evenly mixed with the air in the cylinder. Ignition is then initiated by autoignition, i.e., thermodynamic ignition via compression heating. The objective of HCCI is to use autoignition of the lean and homogeneous mix to provide a uniform and relatively slow non-diffusion (or minimized diffusion) burn, resulting in significantly lower combustion chamber temperatures and diminished $NO_x$ production (which thrives at high temperature), as well as lower soot production owing to enhanced mixing. In contrast, a richer mixture (such as that necessary for flame propagation from the spark in an SI engine) will burn more quickly at greater temperature, and therefore may result in greater $NO_x$ production.

Another promising premixing technology is the Modulated Kinetics (MK) technique, which might be regarded as being a species of HCCI. MK combustion is primarily characterized by three features: (1) a leaner-than-usual fuel/air mixture is used; (2) injection is made at or near top dead center (often after TDC); and (3) the ignition delay exceeds the injection duration (so that the fuel/air mixture is at least partially premixed prior to combustion). In essence, MK combustion involves use of relatively late injection(s) in the "general" HCCI combustion method described above, and concentrates on using the ignition delay for premixing. For further discussion on MK combustion, see, e.g., Kimura et al., "Ultra-clean combustion technology combining a low-temperature and premixed combustion concept for meeting future emissions standards," SAE paper 2001-01-200, 2001.

As the foregoing references note, while HCCI-type premixing processes might be beneficially implemented in CI engines to achieve their high efficiency without their customarily high emissions, HCCI is also hard to accomplish owing to the difficulties in igniting the lean mix and/or controlling the start of ignition. Combustion in an SI engine is readily initiated by the spark, with premixed burning occurring afterward; similarly, combustion in a conventional CI engine is initiated by fuel injection near top dead center (at or slightly after the end of the compression stroke) when thermodynamic conditions for autoignition are favorable, with diffusion burning occurring afterward. However, HCCI does not utilize a spark, nor is it desirable for HCCI to use the rich mixture needed for effective use of a spark. It is also difficult for HCCI to achieve a homogeneous charge or premixed burning if injection near top dead center is used, since there is less time for mixing to occur before ignition. Thus, a key area of study in the HCCI field is how to efficiently initiate ignition, and more critically, how to effect ignition at the desired time. While these issues are somewhat straightforward where CI engines operate under a relatively rigid set of operating conditions (as with diesel generators, which tend to operate at relatively constant speeds and loads), these issues become exceedingly complex where CI engines must operate at varying speeds and loads (as in automotive/vehicular operations). These ignition and timing problems are the primary reason why HCCI methodologies have not attained widespread use outside of generators and other constant speed/load applications.

In view of the foregoing discussion, there is a significant need for methods and apparata which assist in obtaining premixed burning, particularly premixed burning which achieves or approximates HCCI burning, so as to allow exploitation of the high efficiency of CI engines without the detriment of their high pollutant emissions.

DETAILED DESCRIPTION OF PREFERRED VERSIONS OF THE INVENTION

The invention, which is defined by the claims set forth at the end of this document, is directed to methods which at least partially alleviate the aforementioned problems. To allow a reader to better compare the invention to the preexisting technology described above, preferred features of the invention will now be more specifically described with reference to FIG. 1. Thus, it should be understood that while FIG. 1 bears the label "prior art" to denote that the exemplary structure shown therein is well known, the following description describes how the invention might be implemented in previously-known engines of the type shown in FIG. 1 or of other types (though it should also be understood that the invention might be implemented in other types of engines which are yet to be developed).

A particularly preferred version of the invention involves briefly opening at least one of the combustion chamber valves 110 and 114 for at least one discrete period sometime during the compression and/or power strokes, resulting in one or more of the following benefits:

(1) Greater mixing may be obtained within the combustion chamber 102. If one of the combustion chamber valves 110 and 114 is opened for a brief period, the gases within the combustion chamber 102 will rapidly exit from the opened valve into its associated manifold 112 or 116 during this period. The escaping gases may generate mixing flows within the combustion chamber 102, which may enhance burning of particulates and thereby result in lower emissions.

(2) The conditions in combustion chamber 102 can be altered to effect a change in the time ignition is initiated, thereby allowing the ignition timing to be varied as desired to achieve HCCI. Since ignition timing is largely dependent on the pressure (and temperature) of the gases within the combustion chamber 102, releasing the combustion chamber 102 gases by briefly opening one or more of the combustion chamber valves 110 and/or 114 will introduce an ignition delay depending on the resulting drop in pressure (and temperature). Thus, by opening one or more combustion valves 110 and/or 114 (and opening them simultaneously or sequentially, where multiple valves are opened), one can tailor combustion chamber pressures (and to some degree temperatures) so that peak values can be precisely timed, allowing control over ignition timing.

Since the pressure generated within the combustion chamber 102 is used to generate the power output from the engine 100, it might be regarded as contrary to the purposes of the engine 100 to open one or more of the combustion chamber valve(s) 110 and/or 114 for a discrete period sometime during the compression and/or power strokes: the release of pressure from the combustion chamber 102 results in a power loss. However, the power loss may be acceptable if emissions reduction and other objectives are met. The pressure loss within the combustion chamber 102 will depend on the length of the period during which the combustion chamber valve(s) 110 and/or 114 is/are opened, and the degree to which they are opened. It is believed that the benefits of the invention would best be achieved if the period and extent of valve opening be limited such that no more than 20% of the mass of the combustion chamber 102 contents (as measured after fuel injection) be released during all discrete openings of the valves 110 and 114 during the compression and/or power strokes, since computerized engine simulations appear to indicate that more substantial power losses occur if more than approximately 15% of the combustion chamber 102 mass is released. It follows from the foregoing that it will usually be desirable to implement the invention in such a manner that any mixing and/or ignition timing objectives are met while releasing as little of the combustion chamber mass (and thus pressure) as possible. Thus, it is expected that when the invention is implemented in most diesel engines by a single opening of a single one of the combustion chamber valves 110 and 114 to its fully open position (or nearly so), it will usually be desirable to open the valve for no more than 5 degrees of crankshaft revolution, since computerized engine simulations indicate that more substantial power losses occur above approximately 7 degrees. More preferably, the period will not exceed approximately 5 degrees. Where the invention is implemented by opening more than one combustion chamber valve (e.g., by opening both an intake valve 110 and an exhaust valve 114, or by opening more than one intake and/or exhaust valve 114 where multiple intake valves 110 and/or exhaust valves 114 are present), it is expected that the foregoing parameters would apply to the cumulative openings of the valves 110 and 114. The same principle applies where a combustion chamber valve is opened more than once during compression and/or power strokes.

The timing of the valve opening may also vary depending on which of the two aforementioned benefits is to be achieved, and the degree to which it is to be achieved. It is expected that the objective of greater mixing is best accomplished if one or more of the combustion chamber valves 110 and 114 is opened during the first half of the power stroke, most preferably within about 50 degrees after TDC (i.e., approximately the first quarter of the power stroke). At this time, ignition has usually started and combustion is underway.

In contrast, to achieve the objective of ignition timing, it is expected that any openings of the valves 110 and 114 are usually best implemented starting in the latter half of the compression stroke, most preferably at 50 degrees before TDC or thereafter. Openings of the valves 110 and 114 could occur earlier, but since ignition delay occurs with each valve opening owing to pressure release from the combustion chamber 102, and ignition is usually desired late in the compression stroke or early in the expansion stroke, openings of the valves 110 and 114 during the latter half of the compression stroke (particularly at about 30 degrees before TDC and thereafter) should afford more precise control of ignition timing.

The foregoing discussion suggests that where ordinary engine speed/load conditions are presumed, the mixing objective is generally better achieved with openings of the valves 110 and 114 after TDC, whereas the ignition timing objective is generally better achieved with openings of the valves 110 and 114 before TDC. However, openings of the valves 110 and 114 before TDC will have an impact on mixing as well. Similarly, openings of the valves 110 and 114 after TDC may also have an impact on ignition timing provided ignition has not already begun. To illustrate, some combustion schemes—such as the Modified Kinetics (MK) combustion methodology, where ignition is often desired after the power stroke has begun—may benefit from valve openings after TDC to control ignition timing.

As noted above, the invention may be accomplished by opening more than one of the intake and/or exhaust valves 110 and 114, and/or by opening one or more of these valves more than once during a combustion cycle. It is expected that it will generally be most beneficial to open one or more intake valves 110, since any unburned fuel and/or particulates ejected from the combustion chamber 102 will then be retained in the intake manifold 112 for later readmission into the combustion chamber 102 during the next intake stroke. The unburned fuel and particulates (if any) ejected from the intake valve(s) 110 during one combustion cycle will therefore be taken up for consumption in the following cycle. In contrast, if the invention is implemented by alternatively or additionally opening one or more exhaust valves 114, any unburned fuel and/or particulates escaping the combustion chamber 102 will exit to the exhaust manifold 116 to exit as pollutant emissions (unless some form of after-treatment is applied to the exhaust gases). Owing to these emissions, it is expected that implementation of the invention by opening one or more exhaust valves 114 will generally be undesirable, unless any resulting emissions are outweighed by any corresponding mixing and/or ignition timing benefits.

In some instances, opening of exhaust valves 114 warrants serious consideration despite any emissions drawbacks. To illustrate, since exhaust valves 114 are often spaced at opposite ends of the combustion chamber 102 from any intake valves 110, it may in some cases be beneficial to first open an exhaust valve 114 and then an intake valve 110, or conversely first open an intake valve 110 followed by opening of an exhaust valve 114, to better achieve thorough mixing throughout the entirety of the combustion chamber 102. By opening the valves 110 and 114 at different times, a sort of back-and-forth "sloshing" effect is achieved in the contents of the combustion chamber 102, resulting in thorough mixing. However, the same effect might be accomplished by only opening intake valves 110 if multiple spaced intake valves 110 are present.

Since most standard valve actuation schemes couple valve actuation to crankshaft motion, and it would often be difficult and expensive to modify any cams or other intervening structure to effectively actuate the valves to implement the invention, it is expected that the invention would make beneficial use of variable valve actuation (VVA) technologies. Since variable valve actuators (VVAs) allow precise control of valve opening and closing times, and/or to the degree of valve opening/closing, they allow a readily available means for implementing the invention.

At various points in the foregoing discussion, preferred operating parameters were noted for the invention, with such parameters being determined in view of computerized engine simulations. These simulations were performed using WAVE simulation software (Ricardo PLC, Shoreham-by-Sea, West Sussex, England) with a Caterpillar 3401E SCOTE engine (Caterpillar Inc., Peoria, Ill., USA) running at 821 rpm, 25% load, with 61.2 mg of fuel being injected per cycle starting at 20 degrees before TDC. It should be understood that different preferred operating parameters might be derived if engines having different configurations and/or operating conditions are tested.

Note that various preferred versions of the invention are shown and described above to illustrate different possible options for the invention and the varying ways in which these options may be combined. Apart from combining the different options of the foregoing versions of the invention in varying ways, other modifications are also considered to be within the scope of the invention. Following is an exemplary list of such modifications.

First, any variable valve actuators (VVAs) used to implement the invention may make use of regeneration methodologies, i.e., recovery of energy which would otherwise be lost by the engine or by associated components, to better decrease energy demands from valve actuation. Exemplary regeneration methodologies may be seen in U.S. Pat. No. 6,315,265 (recovery of energy captured from valve during valve deceleration), as well as in U.S. Pat. Nos. 6,082,328 and 6,012,424 (recovery of energy from vehicle braking systems).

Second, the invention might be implemented by opening a combustion chamber valve other than an intake valve (or valves) and/or an exhaust valve (or valves). For example, a combustion chamber might be separated from an adjacent supplemental chamber (provided outside the cylinder) by a supplemental combustion chamber valve which serves neither intake nor exhaust purposes. The combustion chamber contents might be "vented" into this supplemental chamber at appropriate times to serve the mixing and/or ignition timing functions of the invention.

Third, while the invention is believed to have most beneficial application to CI engines, it might be utilized in SI engines as well (particularly in SI engines implementing HCCI-type or similar combustion schemes). In this case, the primary benefit of the invention would likely result from the enhanced mixing that the invention can provide, rather than from ignition timing modification (which is more readily controlled in an SI engine via spark timing).

The invention is not intended to be limited to the preferred versions of the invention described above, but rather is intended to be limited only by the claims set out below. Thus, the invention encompasses all different versions that fall literally or equivalently within the scope of these claims.

What is claimed is:

1. A method for modifying combustion in a combustion chamber of a 4-stroke internal combustion engine running under standard warm engine operating temperatures, the method comprising the step of briefly opening a combustion chamber valve sometime during a period spanning:
   a. the latter half of the compression stroke, and
   b. the first half of the power stroke.

2. The method of claim 1 wherein the combustion chamber valve is opened during the period of crankshaft rotation between:
   a. 50 degrees before top dead center, and
   b. 50 degrees after top dead center.

3. The method of claim 1 wherein the combustion chamber valve is open for no greater than approximately 7 degrees of crankshaft rotation.

4. The method of claim 1 wherein the combustion chamber valve is open for no greater than approximately 5 degrees of crankshaft rotation.

5. The method of claim 1 wherein the combustion chamber valve is open for no greater than approximately 3 degrees of crankshaft rotation.

6. The method of claim 1 wherein the opening of the combustion chamber valve effects an escape of no greater than approximately 15% of the mass of the combustion chamber contents.

7. The method of claim 1 wherein the combustion chamber valve is briefly opened two or more times during the period.

8. The method of claim 7 wherein the two or more openings of the combustion chamber valve collectively effect an escape of no greater than approximately 15% of the mass of the combustion chamber contents.

9. The method of claim 7 wherein the two or more openings of the combustion chamber valve collectively occur over no greater than approximately 7 degrees of crankshaft rotation.

10. The method of claim 1 wherein the combustion chamber valve is an intake valve.

11. The method of claim 1 wherein multiple combustion chamber valves are briefly opened during the period.

12. The method of claim 11 wherein at least some of the multiple combustion chamber valves are briefly opened during the period starting at different times.

13. The method of claim 12 wherein the multiple combustion chamber valves include an intake valve and an exhaust valve, and wherein one of these valves is opened during the period before the other.

14. The method of claim 1 wherein:
   a. the combustion chamber valve which is briefly opened during the period is an intake valve, and
   b. the method further comprises the step of briefly opening an exhaust valve during the period.

15. The method of claim 14 wherein the intake valve and exhaust valve which are briefly opened during the period are opened starting at different times.

16. The method of claim 14 wherein the openings of the intake valve and exhaust valve collectively effect an escape of no greater than approximately 15% of the mass of the combustion chamber contents.

17. The method of claim 1 wherein the combustion chamber valve is briefly opened during the period of crankshaft rotation between:
   a. 30 degrees before top dead center, and
   b. 30 degrees after top dead center.

18. The method of claim 17 wherein the combustion chamber valve is open for no greater than approximately 7 degrees of crankshaft rotation.

19. A method for modifying combustion in a combustion chamber of a 4-stroke internal combustion engine running under standard warm engine operating temperatures, the method comprising the step of opening a combustion chamber valve during at least one of the compression stroke and the power stroke, with such opening effecting an escape of no more than approximately 15% of the mass of the combustion chamber contents.

20. The method of claim 19 wherein the combustion chamber valve is opened sometime during a period spanning:
   a. the latter half of the compression stroke, and
   b. the first half of the power stroke.

21. The method of claim 19 wherein the combustion chamber valve is opened during the period of crankshaft rotation between:
   a. 50 degrees before top dead center, and
   b. 50 degrees after top dead center.

22. The method of claim 19 wherein the combustion chamber valve is opened during the period of crankshaft rotation between:
   a. 30 degrees before top dead center, and
   b. 30 degrees after top dead center.

23. The method of claim 19 wherein the combustion chamber valve is opened at or substantially near the time of ignition.

24. The method of claim 19 wherein the combustion chamber valve is open for no greater than approximately 7 degrees of crankshaft rotation.

25. The method of claim 19 wherein the combustion chamber valve is open for no greater than approximately 5 degrees of crankshaft rotation.

26. The method of claim 19 wherein the combustion chamber valve is open for no greater than approximately 3 degrees of crankshaft rotation.

27. The method of claim 19 wherein the combustion chamber valve is briefly opened two or more times during at least one of the compression stroke and the power stroke.

28. The method of claim 27 wherein the two or more openings of the combustion chamber valve collectively occur over no greater than approximately 7 degrees of crankshaft rotation.

29. The method of claim 19 wherein the combustion chamber valve is an intake valve.

30. The method of claim 19 wherein multiple combustion chamber valves are opened during at least one of the compression stroke and the power stroke.

31. The method of claim 30 wherein at least some of the multiple combustion chamber valves are opened during at least one of the compression stroke and the power stroke starting at different times.

32. The method of claim 31 wherein the multiple combustion chamber valves include an intake valve and an exhaust valve, and wherein one of these valves is opened before the other during at least one of the compression stroke and the power stroke.

33. The method of claim 19 wherein:
   a. the combustion chamber valve which is briefly opened during at least one of the compression stroke and the power stroke is an intake valve, and
   b. the method further comprises the step of briefly opening an exhaust valve during at least one of the compression stroke and the power stroke.

34. The method of claim 33 wherein the intake valve and exhaust valve which are briefly opened during at least one of the compression stroke and the power stroke are opened starting at different times.

35. A method for modifying combustion in a combustion chamber of a 4-stroke internal combustion engine running under standard warm engine operating temperatures, the method comprising the step of opening a combustion chamber valve for at least one discrete period, each period:
   a. starting and ending sometime between the start of the compression stroke and the end of the power stroke, and
   b. effecting an escape of no more than 20% of the mass of the combustion chamber's contents.

36. The method of claim 35 wherein the combustion chamber valve is open for no greater than approximately 7 degrees of crankshaft rotation.

37. The method of claim 35 wherein the combustion chamber valve is open for no greater than approximately 5 degrees of crankshaft rotation.

38. The method of claim 35 wherein the combustion chamber valve is open for no greater than approximately 3 degrees of crankshaft rotation.

39. The method of claim 35 wherein the combustion chamber valve is opened for two or more discrete periods between the start of the compression stroke and the end of the power stroke.

40. The method of claim 39 wherein the two or more periods collectively occur over no greater than approximately 7 degrees of crankshaft rotation.

41. The method of claim 35 wherein the chanter valve is an intake valve.

42. The method of claim 35 wherein multiple combustion chamber valves are each opened for at least one discrete period, each period starting and ending sometime between the start of the compression stroke and the end of the power stroke.

43. The method of claim 42 wherein at least some of the multiple combustion chamber valves are opened starting at different times.

44. The method of claim 43 wherein the multiple combustion chamber valves include an intake valve and an exhaust valve, and wherein one of these valves is opened before the other.

45. The method of claim 35 wherein:
   a. at least one intake valve, and
   b. at least one exhaust valve,
   are each opened for at least one discrete period, each period starting and ending sometime between the start of the compression stroke and the end of the power stroke.

46. The method of claim 45 wherein the intake and exhaust valves are opened starting at different times.

47. The method of claim 35 wherein the discrete period occurs sometime during the range of crankshaft rotation between:
   a. 30 degrees before top dead center, and
   b. 30 degrees after top dead center.

48. The method of claim 47 wherein the combustion chamber valve is open for no greater than approximately 7 degrees of crankshaft rotation.

* * * * *

UNITED STATES PATENT AND TRADEMARK OFFICE
CERTIFICATE OF CORRECTION

PATENT NO. : 6,736,106 B2
DATED : May 18, 2004
INVENTOR(S) : Reitz, Rolf Deneys

It is certified that error appears in the above-identified patent and that said Letters Patent is hereby corrected as shown below:

<u>Title page,</u>
Item [22], replace "Filed: Jan. 23, 2002" with -- Filed: Jan. 23, 2003 --.

Signed and Sealed this

Thirteenth Day of July, 2004

JON W. DUDAS
*Acting Director of the United States Patent and Trademark Office*